United States Patent [19]

Kasori et al.

[11] Patent Number: 4,768,859

[45] Date of Patent: Sep. 6, 1988

[54] CLADDING GLASS FOR OPTICAL FIBER

[75] Inventors: Mituo Kasori, Kawasaki; Hiroshi Imagawa, Yokohama; Hironori Maki, Kawasaki; Kenji Yagi, Yokohama; Osamu Kokubo, Sagamihara, all of Japan

[73] Assignees: Kabushiki Kaisha Toshiba; Showa Electric Wire & Cable Co., Ltd., both of Japan

[21] Appl. No.: 111,153

[22] Filed: Oct. 22, 1987

Related U.S. Application Data

[63] Continuation of Ser. No. 667,804, Nov. 2, 1984.

[30] Foreign Application Priority Data

Jan. 24, 1984 [JP] Japan .................................. 59-9400

[51] Int. Cl.⁴ ........................... G02B 6/00; G02B 6/18; C03C 3/118
[52] U.S. Cl. ............................... 350/96.34; 350/96.31; 501/59
[58] Field of Search ............... 350/96.29, 96.31, 96.34; 501/35, 66, 69

[56] References Cited

U.S. PATENT DOCUMENTS

| | | | |
|---|---|---|---|
| 3,607,322 | 9/1971 | Brady et al. | 350/96.34 X |
| 4,001,741 | 1/1977 | Lindig et al. | 501/66 X |
| 4,264,131 | 4/1981 | Sawamura et al. | 350/96.34 |
| 4,367,012 | 1/1983 | Ikeda et al. | 350/96.34 |
| 4,418,985 | 12/1983 | Kasori et al. | 350/96.34 |
| 4,439,008 | 3/1986 | Joormann et al. | 350/96.34 X |
| 4,495,298 | 1/1985 | Yamagishi et al. | 501/66 X |
| 4,562,161 | 12/1985 | Mennemann et al. | 501/66 X |
| 4,565,791 | 1/1986 | Boudot et al. | 501/66 X |
| 4,573,762 | 3/1986 | Joormann et al. | 350/96.34 |

OTHER PUBLICATIONS

Chemical Abstracts, vol. 101, No. 8, Aug. 20, 1984, p. 237, No. 59068k.

Primary Examiner—William L. Sikes
Assistant Examiner—Akm E. Ullah
Attorney, Agent, or Firm—Foley & Lardner, Schwartz, Jeffery, Schwaab, Mack, Blumenthal & Evans

[57] ABSTRACT

A cladding glass for optical fiber comprises 60 to 80% by weight of silicon dioxide ($SiO_2$), 0.5 to 10% by weight of aluminum oxide ($Al_2O_3$), 9 to 17% by weight of an alkali metal oxide, 3 to 15% by weight of boron oxide ($B_2O_3$) and more than 0 but not more than 3% by weight of fluorine (F). The cladding glass of this invention can simultaneously satisfy low refractive index and lowered viscosity, and is also excellent in water resistance and weathering resistance.

12 Claims, 1 Drawing Sheet

CLADDING GLASS FOR OPTICAL FIBER

This application is a continuation of application Ser. No. 667,804 filed Nov. 2, 1984.

BACKGROUND OF THE INVENTION

This invention relates to a cladding glass for an optical fiber, more particularly to a cladding glass for an optical fiber having low refractive index and low viscosity.

An optical glass fiber is generally constituted of a core glass and a cladding glass which covers around the core glass. Such a cladding glass is required to have a refractive index smaller than that of the core glass. Thus, the light incident upon the core glass is confined within the core glass while repeating total reflections at the boundary surface between the core glass and the cladding glass to be transmitted toward the other end.

In such an optical fiber, the cladding glass should preferably have a low refractive index. This is because the numerical apperture of the fiber is increased by making the difference in refractive index between the core glass and the cladding glass, whereby the ability to confine the light to be transmitted within the core glass can be enhanced.

In order to make greater the refractive index difference as mentioned above, one may in the first place think of increasing the refractive index of the core glass. However, in that case, the core glass becomes readily crystallizable and tendency to deteriorate weathering resistance and increase scattering loss. Thus, increase of the refractive index of the core glass is limited of itself.

Another method is to lower the refractive index of the cladding glass. For this purpose, components such as an alkali metal, an alkaline earth metal, etc. in the glass may be reduced. However, the following inconvenience is caused. That is, due to elevation of melting temperature, no sufficient vitrification can proceed at a practical temperature (e.g. 1400° C. or lower), whereby it is rendered factually impossible to obtain a homogeneous glass. Also, such a glass becomes highly viscous to exhibit a great viscosity difference from the core glass during fiber drawing. As the result, during fiber drawing according to the double crucible method conventionally practiced, it becomes difficult to adjust the ratio of core diameter to cladding diameter, and the fiber obtained is lowered in dimensional uniformity.

For reducing the viscosity of a highly viscous glass, the amount of the components which have low melting temperature such as an alkali metal, boron oxide, etc. may be increased. However, in that case, the glass obtained is increased in refractive index and also the problems such as deterioration in water resistance, crystallization, etc. will occur.

Thus, it would be very desirable to develop a glass endowed with both properties of low refractive index and lowered viscosity during drawing as the cladding glass for an optical fiber.

SUMMARY OF THE INVENTION

An object of this invention is to provide a glass suitable as the cladding glass for an optical fiber, which can satisfy at the same time low refractive index and lowered viscosity, and is also excellent in weathering resistance.

The cladding glass for an optical fiber of this invention comprises 60 to 80% by weight of silicon dioxide (SiO$_2$), 0.5 to 10% by weight of aluminum oxide (Al$_2$O$_3$), 9 to 17by weight of an alkali metal oxide, 3 to 15% by weight of boron oxide (B$_2$O$_3$) and more than 0 but not more than 3% by weight of fluorine (F).

DESCRIPTION OF THE PREFERRED EMBODIMENTS

Figure 1:
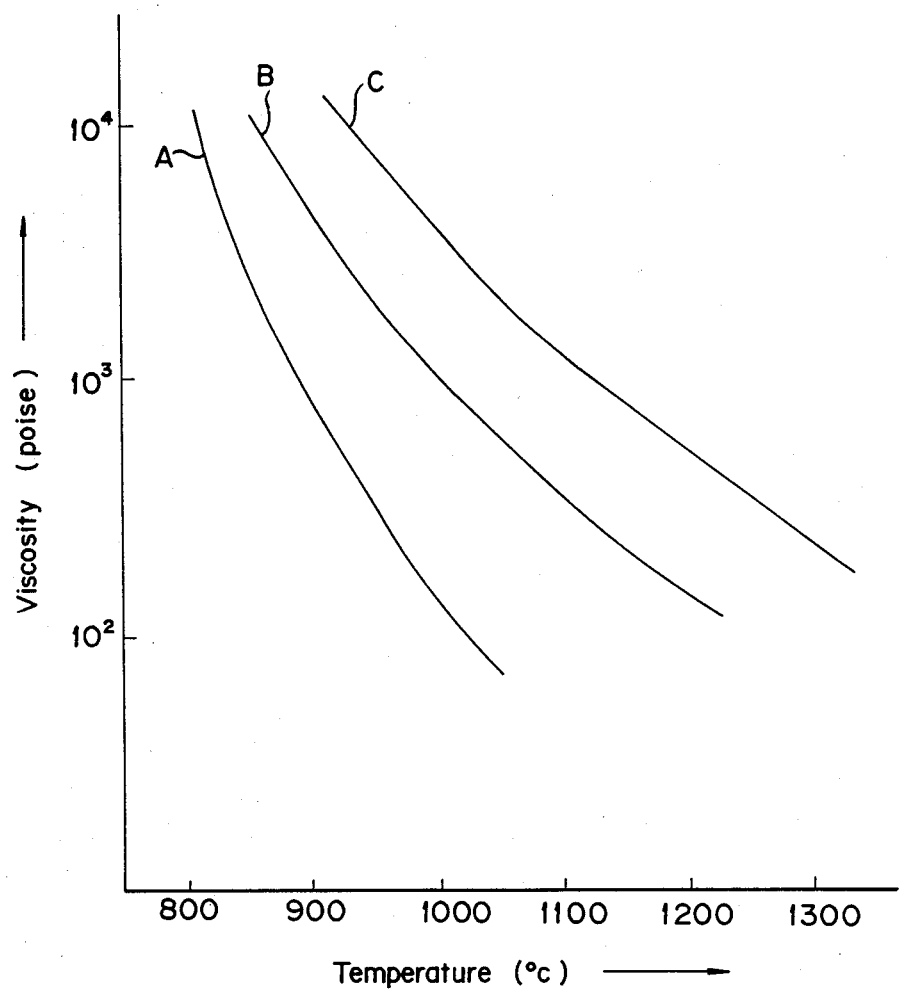
FIG. 1 is the graph showing the relationship of viscosity of glass versus temperature, in which A represents the curve for the core glass employed for the optical fiber 1 in Table 2, B that for the cladding glass of Example 4 and C that for the cladding glass of Comparative example 1, respectively.

In this invention, SiO$_2$ is the essential component for formation of glass, and its content is required to be 60 to 80% by weight, preferably 66 to 71% by weight. If the amount is less than 60% by weight, water resistance of the glass will be deteriorated. On the other hand, at a level in excess of 80% by weight, the viscosity of the glass is increased to exhibit a greater difference in viscosity at drawing temperature from the core glass.

Al$_2$O$_3$ is one of the essential components contributing to improvement of water resistance of the glass and the effect of inhibiting devitrification, and its content is 0.5 to 10% by weight, preferably 4 to 7% by weight. If the content is less than 0.5% by weight, the above effects cannot sufficiently be exhibited, while an amount over 10% by weight will contrariwise cause readily devitrification.

The alkali metal oxide is one of the essential components contributing to lowering in viscosity, and its content is 9 to 17% by weight, preferably 12 to 16% by weight. At a level less than 9% by weight, devitrification of the glass is liable to occur. On the other hand, at a level higher than 17% by weight, deterioration in water resistance will be brought about. Such alkali metal oxides may be inclusive of at least one of sodium oxide (Na$_2$O), potassium oxide (K$_2$O) and lithium oxide (Li$_2$O). The composition of the alkali metal oxides has effects on various properties of the glass, and it is particularly preferred to comprise 6 to 8% by weight of sodium oxide (Na$_2$O), 3.5 to 6% by weight of potassium oxide (K$_2$O) and 2 to 4% by weight of lithium oxide (Li$_2$O)

Boron oxide (B$_2$O$_3$) is one of the essential components contributing to improvement of water resistance and the effect of inhibiting devitrification, and its content is required to be 3 to 15% by weight, preferably 7 to 12% by weight. With a content less than 3% by weight, no such effect as mentioned above can be obtained, while a content exceeding 15% by weight will not only deteriorate water resistance but also give a higher refractive index of the glass.

Fluorine (F) is a component contributing to lowering in refractive index and lowering in viscosity of the glass. The content of fluorine is required to be more than 0 and not more than 3% by weight, preferably 0.5 to 3% by weight. If the content exceeds 3% by weight, the phase separation will occur to become opaque, and further the following inconvenience will be caused during melting by heating. That is, if the content of fluorine is increased greater than the upper limit, the amount of fluorine evaporated during melting by heating is increased, and the vapor attached on equipments or instruments of relatively lower temperatures existing nearby and dropped into the glass melt, thereby forming nonhomogeneous portions. Such an inconvenience is particularly crucial during fiber drawing, and such dropped matters may light cause scattering defects in the fiber to increase markedly the optical loss. Also, although such an inconvenience can be more or less be alleviated by improvement of the temperature distribution within the drawing furnace or compulsory displacement of the atmosphere within the furnace, even such measures become hardly applicable if the content of fluorine exceeds 3% by weight. For incorporation of fluorine, one can conveniently employ, for example, the method in which a fluoride such as sodium silicofluoride, sodium fluoride, etc. is added to a mixture of other starting materials and vitrified together.

The glass of this invention contains the above components as the essential components, and it is preferable to further contain the components as described below for improvement of its characteristics.

The first component is an alkaline earth metal oxide, as exemplified by one or both of calcium oxide (CaO) and magnesium oxide (MgO). These components contribute to improvement of weathering resistance. The content of each or both of these components should preferably be suppressed to not higher than 8% by weight, more preferably not higher than 3% by weight. If the content is over 8% by weight, the glass becomes not only susceptible to devitrification but also increased in refractive index.

The second component is at least one of zinc oxide (ZnO), zirconium dioxide ($ZrO_2$) and titanium dioxide ($TiO_2$). These components contribute to chemical resistance, and its content is limited to 7% by weight or lower, further 3% by weight or less. A content in excess of 7% by weight is not suitable, because striae are liable to be formed on the glass.

The core glass to be used in combination with the cladding glass of this invention may be a multi-component glass with any composition, provided that it has various characteristics such as refractive index, coefficient of thermal expansion, high temperature viscosity, tendency for devitrification, etc. suitable for forming a desired optical fiber. For example, there may be employed a multi-component glass comprising 35 to 45% by weight of $SiO_2$; 35 to 45% by weight of BaO; 3 to 7% by weight of $Al_2O_3$; 9 to 13% by weight of $B_2O_3$; 1.2 to 6% by weight of at least one selected from the group consisting of $Na_2O$, $K_2O$ and $Li_2O$, with $Na_2O$ being not more than 2.5% by weight; and 4 to 11% by weight of at least one selected from the group consisting of MgO and CaO, or a multi-component glass comprising 50 to 70% by weight of $SiO_2$; 0.5 to 7% by weight of $Al_2O_3$; 10 to 23% by weight of at least one selected from the group consisting of $Na_2O$, $K_2O$ and $Li_2O$; 10% by weight or less of CaO; 4 to 15% by weight of $B_2O_3$; and 5% by weight or less of MgO.

In these core glasses, when F component is incorporated in a small amount similarly as in the cladding glass, the temperature during melting of the glass or in the step of fiber drawing can be made lower, whereby contamination from the surrounding environment can be inhibited.

EXAMPLES

The respective components as set forth in Table 1 were charged in a platinum crucible at the proportions as indicated in the Table and molten in an electric furnace to prepare glasses having respective compositions.

For each of these glasses, refractive index ($n_D$), mean coefficient of thermal expansion at 100° to 300° C. ($\alpha$:x $10^{-7}$/° C.), softening temperature (Ts:° C.), degree of devitrification, water resistance and weathering resistance were examined. Degree of devitrification, water resistance and weathering resistance were examined according to the following methods.

Degree of Devitrification

Glass was subjected to heat treatment at the respective temepratures of 850° to 950 ° C., which is the expected temperature range for drawing of fiber, and the degree of devitrification was evaluated as follows:
A: no vitrification,
B: denaturation of surface,
C: devitrification of surface, and
D: devitrification of the whole.

Water Resistance

Powdery sample (5.0 g) of each glass with particle sizes which pass through the JIS standard sieve of 0.5 mm mesh but do not through the JIS standard sieve of 0.3 mm was boiled in 100 ml of distilled water for one hour, and the change before and after boiling was measured and indicated in weight reduction (%). The sample with greater weight reduction is inferior in water resistance.

Weathering Resistance

Each test piece of glasses was optically polished, and thus treated samples were then carried out 60 cycles of an accelerating test which comprises, as one cycle, allowing the samples at 80°±2 ° C. under a relative humidity of 95 to 100% for 4 hours and at 25°±2 ° C. under a relative humidity of 20 to 30% for 2 hours. After the cycle test, an amount of the Haze generated on the surface of the glass was evaluated by the Haze meter and, in comparison with the SK-16 glass (standard sample) which was carried out the same accelerating test, classified according to the following judgements:
a: more difficult in haze generation than SK-16;
b: similar in haze generation to SK-16;
c: easier in haze generation than SK-16.

The above results are summarized in Table 1.

TABLE 1

| | Glass composition (% by weight) | | | | | | | | | | | |
| --- | --- | --- | --- | --- | --- | --- | --- | --- | --- | --- | --- | --- |
| | | | | Alkali metal oxide | | | Alkaline earth metal oxide | | | | | |
| | $SiO_2$ | $Al_2O_3$ | $B_2O_3$ | $Na_2O$ | $K_2O$ | $Li_2O$ | CaO | MgO | ZnO | $Zr_2O$ | $TiO_2$ | F |
| Example 1 | 67.39 | 5.99 | 8.64 | 5.40 | 7.86 | 2.95 | — | — | — | — | — | 1.77 |
| Example 2 | 67.96 | 6.07 | 8.76 | 6.97 | 4.78 | 2.98 | — | — | 1.99 | — | — | 0.49 |
| Example 3 | 67.62 | 6.04 | 8.71 | 6.93 | 4.75 | 2.97 | — | — | 1.98 | — | — | 1.00 |
| Example 4 | 67.29 | 6.01 | 8.67 | 6.90 | 4.73 | 2.96 | — | — | 1.97 | — | — | 1.47 |
| Example 5 | 67.13 | 5.99 | 8.65 | 6.88 | 4.72 | 2.95 | — | — | 1.97 | — | — | 1.71 |
| Example 6 | 66.96 | 5.98 | 8.63 | 6.86 | 4.71 | 2.94 | — | — | 1.96 | — | — | 1.96 |

TABLE 1-continued

| | | | | | | | | | | | | |
|---|---|---|---|---|---|---|---|---|---|---|---|---|
| Example 7 | 71.40 | 1.97 | 8.68 | 6.90 | 4.73 | 2.96 | — | — | 1.97 | — | — | 1.39 |
| Example 8 | 71.95 | 6.00 | 3.94 | 6.89 | 4.72 | 2.95 | — | — | 1.97 | — | — | 1.58 |
| Example 9 | 63.66 | 6.04 | 8.71 | 6.93 | 4.75 | 2.97 | 3.96 | 1.98 | — | — | — | 1.00 |
| Example 10 | 68.25 | 6.05 | 8.73 | 6.94 | 4.76 | 2.98 | 0.99 | 0.50 | — | — | — | 0.80 |
| Example 11 | 62.03 | 5.95 | 13.65 | 6.83 | 4.69 | 2.93 | — | 0.99 | — | 0.98 | — | 1.95 |
| Example 12 | 70.82 | 6.03 | 5.93 | 6.92 | 4.75 | 2.97 | 0.49 | — | — | — | 0.99 | 1.10 |
| Example 13 | 66.18 | 7.80 | 8.58 | 6.82 | 4.68 | 2.92 | 0.49 | — | — | — | — | 2.53 |
| Example 14 | 72.30 | 6.03 | 8.70 | 2.97 | 3.96 | 2.97 | — | — | — | 0.99 | 0.99 | 1.09 |
| Example 15 | 60.28 | 7.77 | 11.63 | 5.83 | 4.86 | 3.89 | — | — | 0.97 | 0.97 | 0.97 | 2.83 |
| Example 16 | 67.10 | 5.89 | 8.74 | 3.93 | 3.73 | 3.93 | — | — | 3.93 | 1.96 | — | 0.79 |
| Example 17 | 68.85 | 6.15 | 8.87 | 7.06 | 4.84 | 3.02 | — | — | — | — | — | 1.21 |
| Example 18 | 67.09 | 5.99 | 8.64 | 5.04 | 7.86 | 2.95 | — | — | — | — | — | 2.07 |
| Comparative example 1 | 68.30 | 6.10 | 8.80 | 7.00 | 4.80 | 3.00 | — | — | 2.00 | — | — | — |
| Comparative example 2 | 66.18 | 5.91 | 8.53 | 6.78 | 4.65 | 2.91 | — | — | 1.94 | — | — | 3.10 |

| | Evaluated characteristics | | | | | | |
|---|---|---|---|---|---|---|---|
| | Refractive index ($n_D$) | Softening temperature (Ts: °C.) | Coefficient of thermal expansion ($\alpha: \times 10^{-7}$ °C., 100–300° C.) | Devitrification 850° C. | Devitrification 900° C. | Devitrification 950° C. | Water resistance (weight reduction: %) | Weathering resistance |
|---|---|---|---|---|---|---|---|---|
| Example 1 | 1.5072 | 637 | 82 | A | A | A | 0.03 | a |
| Example 2 | 1.5114 | 656 | 79 | A | A | A | 0.04 | a |
| Example 3 | 1.5099 | 648 | 80 | A | A | A | 0.02 | a |
| Example 4 | 1.5078 | 641 | 79 | A | A | A | 0.02 | a |
| Example 5 | 1.5068 | 633 | 80 | A | A | A | 0.02 | a |
| Example 6 | 1.5058 | 630 | 82 | B | A | A | 0.01 | a |
| Example 7 | 1.5083 | 653 | 81 | C | A | A | 0.07 | a |
| Example 8 | 1.5066 | 651 | 84 | A | A | A | 0.04 | a |
| Example 9 | 1.5190 | 621 | 88 | A | A | A | 0.05 | a |
| Example 10 | 1.5129 | 631 | 82 | A | A | A | 0.04 | a |
| Example 11 | 1.5087 | 609 | 80 | A | A | A | 0.05 | a |
| Example 12 | 1.5079 | 632 | 83 | A | A | A | 0.04 | a |
| Example 13 | 1.5038 | 604 | 80 | A | A | A | 0.02 | a |
| Example 14 | 1.5077 | 672 | 78 | A | A | A | 0.02 | a |
| Example 15 | 1.5053 | 589 | 78 | A | A | A | 0.03 | a |
| Example 16 | 1.5112 | 651 | 82 | A | A | A | 0.02 | a |
| Example 17 | 1.5077 | 639 | 82 | A | A | A | 0.03 | a |
| Example 18 | 1.5051 | 635 | 82 | A | A | A | 0.03 | a |
| Comparative example 1 | 1.5131 | 665 | 78 | A | A | A | 0.05 | a |
| Comparative example 2 | — | 658 | 85 | C | C | A | 0.02 | a |

As apparently seen from the above results, the cladding glass for optical fiber of this invention was confirmed to have low refractive index and low softening temperature and also to be excellent in weathering resistance.

In contrast, the glass for cladding of Comparative example 2 has the drawback of being devitrified at 900° C. which is a practical fiber drawing temperature, and no measurement of refractive index was possible because of opaque of the glass sample after preparation.

Next, using the glasses of Example 4, Example 13, Example 15 and Example 17, respectively, as the glass for cladding, and the glasses having the compositions and characteristics as indicated in Table 2, as the core glass, according to the combinations as indicated in Table 2, fiber drawing was performed according to the double crucible method under temperatures of 900° to 950° C. to prepare three kinds of optical fibers. The core diameter was 200 μm and the cladding diameter 250 μm.

For these fibers, the dimensional uniformity in the fiber drawing step and the optical loss when the light with wavelength of 0.84 μm was transmitted was measured. The results are summarized in Table 2.

TABLE 2

| | Optical fiber | | | | | | | |
|---|---|---|---|---|---|---|---|---|
| | 1 | | 2 | | 3 | | 4 | |
| | Core glass | Glass for cladding (Example 4) | Core glass | Glass for cladding (Example 13) | Core glass | Glass for cladding (Example 15) | Core glass | Glass for cladding (Example 17) |
| Glass composition (% by weight) | | | | | | | | |
| $SiO_2$ | 38.13 | 67.29 | 59.5 | 66.18 | 38.13 | 67.76 | 58.6 | 68.85 |
| $Al_2O_3$ | 6.0 | 6.01 | 2.0 | 7.80 | 4.0 | 5.95 | 1.9 | 6.15 |
| $B_2O_3$ | 11.15 | 8.67 | 9.8 | 8.58 | 11.15 | 8.83 | 9.7 | 8.87 |
| $Na_2O$ | 1.23 | 6.90 | 14.9 | 6.82 | 1.23 | 3.97 | 15.6 | 7.06 |
| $K_2O$ | — | 4.73 | 2.7 | 4.68 | 1.87 | 3.77 | 2.8 | 4.84 |
| $Li_2O$ | — | 2.96 | 2.0 | 2.92 | — | 3.97 | 2.1 | 3.02 |
| CaO | 3.55 | — | 6.6 | 0.49 | 5.0 | — | 7.5 | — |
| MgO | 2.27 | — | 2.5 | — | 3.0 | — | 1.8 | — |
| BaO | 37.67 | — | — | — | 35.57 | — | — | — |
| ZnO | — | 1.97 | — | — | — | 3.97 | — | — |

TABLE 2-continued

| | Optical fiber | | | | | | | |
|---|---|---|---|---|---|---|---|---|
| | 1 | | 2 | | 3 | | 4 | |
| | Core glass | Glass for cladding (Example 4) | Core glass | Glass for cladding (Example 13) | Core glass | Glass for cladding (Example 15) | Core glass | Glass for cladding (Example 17) |
| $ZrO_2$ | — | — | — | — | — | 1.98 | — | — |
| $TiO_2$ | — | — | — | — | — | — | — | — |
| F | — | 1.47 | — | 2.53 | — | 0.80 | — | 1.21 |
| Properties of glass | | | | | | | | |
| Refractive index ($n_D$) | 1.5935 | 1.5078 | 1.5358 | 1.5038 | 1.5949 | 1.5112 | 1.5367 | 1.5077 |
| Softening temperature (Ts: °C.) | 732 | 641 | 615 | 604 | 735 | 651 | 615 | 639 |
| Coefficient of thermal expansion ($\alpha: \times 10^{-7}$ °C., 100-300° C.) | 79 | 79 | 110 | 80 | 84 | 82 | 110 | 82 |
| Devitrification | | | | | | | | |
| 850° C. | C | A | A | A | C | A | A | A |
| 900° C. | A | A | A | A | A | A | A | A |
| 950° C. | A | A | A | A | A | A | A | A |
| Water resistance (weight reduction: %) | 0.099 | 0.02 | 0.11 | 0.02 | 0.115 | 0.02 | 0.10 | 0.03 |
| Weathering resistance | a | a | a | a | a | a | a | a |
| Properties of fiber | | | | | | | | |
| Dimensional stability (μm) | ±0.5 | | ±0.4 | | ±0.5 | | ±0.4 | |
| Light loss: wavelength 0.84 μm (dB/Km) | 12.1 | | 6.1 | | 10.8 | | 5.8 | |

For the core glass employed in the optical fiber 1 in Table 2, the glass of Example 4 and the glass of Comparative example 1, viscosities at respective temperatures were measured and shown in FIG. 1. In FIG. 1, A represents the core glass employed in the optical fiber 1 in Table 2, B the cladding glass of Example 4 and C the cladding glass of Comparative example 1. As apparently seen from FIG. 1, by incorporation of fluorine (F), the high temperature viscosity of the glass is lowered to a great extent and the viscosity difference from the core becomes smaller.

As can clearly be seen from the above results, the cladding glass of this invention (1) has characteristics satisfying at the same time lowering in refractive index and lowering in viscosity, (2) therefore enables enhancement of numerical apperture by enlargement of the difference in refractive index from the core glass in optical fiber, and (3) in the step of fiber drawing of the optical fiber, due to the small difference in viscosity from the core glass, increases the degree of freedom in setting of the ratio of core diameter to cladding diameter simultaneously with improvement of dimensional uniformity. And, (4) through lowering in viscosity, the maximum melting temperature can be reduced by about 100° C. as compared with the prior art, whereby generation of bubbles, striae, etc. can be suppressed to improve its melting workability. Also, (5) it is excellent in water resistance and weathering resistance and satisfactorily provided for use in practical application. Further, (6) there occurs substantially no inhomogeneous portion caused by dropping, into glass melts, of vaporized product which generates by addition of fluorine.

As described above, the glass of this invention is suitable as the glass for cladding of optical fiber and its commercial value is very high.

We claim:

1. A cladding glass for optical fiber, which consists essentially of 60 to 80% by weight of silicon dioxide ($SiO_2$); 4 to 7% by weight of aluminum oxide ($Al_2O_3$); 7 to 12% by weight of boron oxide ($B_2O_3$), 6 to 8% by weight of sodium oxide ($Na_2O$), 3.5 to 6% by weight of potassium oxide ($K_2O$), and 2 to 4% by weight of lithium oxide ($Li_2O$), such that the total content of alkali metal oxide in said cladding glass ranges between about 9 and 17% by weight; from 0 to 8% by weight of an alkaline earth metal oxide; more tha 0 and up to 7% by weight of at least one selected from the group consisting of zinc oxide (ZnO), zirconium dioxide ($ZrO_2$) and titanium dioxide ($TiO_2$), wherein the amount of $TiO_2$ is less than 1% of the cladding glass composition; and more than 0 but not more than 3% by weight of fluorine (F), said cladding glass having a refractive index value of not more than 1.511 4.

2. The cladding glass for optical fiber according to claim 1, wherein the content of fluorine is 0.5 to 3.0% by weight.

3. The cladding glass for optical fiber according to claim 1, containing 0 to 3% by weight of an alkalilne earth metal oxide and 0 to 3% by weight of at least one selected from the group consisting of zinc oxide (ZnO), zirconium dioxide ($ZrO_2$) and titanium dioxide ($TiO_2$).

4. The cladding glass for optical fiber according to claim 1, wherein the alkali metal oxide comprises 6 to 8 1% by weight of sodium oxide ($Na_2O$), 3.5 to 6% by weight of potassium oxide ($K_2O$) and 2 to 4% by weight of lithium oxide ($Li_2O$), and further containing 0 to 3% by weight of an alkaline earth metal oxide and 0 to 3% by weight of at least one selected from the group consisting of zinc oxide (ZnO), zirconium dioxide ($ZrO_2$) and titanium dioxide ($TiO_2$).

5. The cladding glass for optical fiber according to claim 4, wherein the alkaline earth metal oxide is one or both of calcium oxide (CaO) and magnesium oxide (MgO).

6. A cladding glass for optical fiber according to claim 1, wherien the total amount of sodium oxide ($Na_2O$), potassium oxide ($K_2O$) and lithium oxide ($Li_2O$) in said cladding glass is 12 to 16% by weight.

7. The cladding glass for optical fiber according to claim 1 wherein the amount of silicon dioxide is from 66 to 71% by weight.

8. An optical fiber comprising a core glass, and a cladding glass according to claim 1.

9. An optical fiber according to claim 8, wherein said core glass comprises from 35 to 45% by weight of $SiO_2$; 35 to 45% by weight of BaO; 3 to 7% by weight of $SiO_2$; 35 to 45% by weight of BaO; 3 to 7% by weight of $Al_2O_3$; 9 to 13% by weight $B_2O_3$; 1.2 to 6% by weight of at least one selected from the group consisting of $Na_2O$, $K_2O$ and $Li_2O$, with $Na_2O$ being more than 2.5% weight; and 4 to 11% by weight of at least one selected from the group consisting of MgO and CaO.

10. An optical fiber according to claim 8, wherein said core glass comprises from 50 to 70% by weight of $SiO_2$; 0.5 to 7% by weight of $Al_2O_3$; 4 to 15% by weight $B_2O_3$; 10 to 23% by weight of at least one selected from the group consisting of $Na_2O$, and $Li_2O$; 10% by weight or less of CAO; and 5% or less by weight of MgO.

11. An opitcal fiber according to claim 8, wherein said core glass additionally comprises fluorine.

12. A cladding glass according to claim 1, wherein said alkaline earth metal oxide is absent.

* * * * *